(12) United States Patent
Hamlin

(10) Patent No.: US 6,665,772 B1
(45) Date of Patent: Dec. 16, 2003

(54) DATA STORAGE METHOD AND DEVICE FOR STORING STREAMING AND NON-STREAMING DATA IN COMMON MEMORY SPACE

(75) Inventor: Christopher L. Hamlin, Los Gatos, CA (US)

(73) Assignee: Western Digital Ventures, Inc., Lake Forest, CA (US)

(*) Notice: Subject to any disclaimer, the term of this patent is extended or adjusted under 35 U.S.C. 154(b) by 408 days.

(21) Appl. No.: 09/628,581

(22) Filed: Jul. 31, 2000

(51) Int. Cl.[7] .............................................. G06F 12/00
(52) U.S. Cl. ..................... 711/112; 711/170; 711/203
(58) Field of Search ................................. 711/112, 170, 711/203, 4

(56) References Cited

U.S. PATENT DOCUMENTS 4,833,548 A * 5/1989 Watanabe .................. 386/105
5,896,364 A * 4/1999 Okazaki et al. ............ 369/275.3
5,959,954 A * 9/1999 Yamamuro .................. 369/47.4
2002/0122111 A1 * 9/2002 Doi et al. .................. 348/14.01

OTHER PUBLICATIONS

"Introduction To Algorithms", Leiserson, Charles E. et al, 7.2 Maintaining the heap property, MIT Press, Cambridge, MASS., Title page, and pp. 143–148.

* cited by examiner

Primary Examiner—Reginald G. Bragdon
(74) Attorney, Agent, or Firm—Milad G. Shara, Esq.; Burns Doane Swecker & Mathis (57) ABSTRACT

The invention is directed to a method and associated device for storing stream and non-streaming data in common memory space of a data storage device. The method includes steps of organizing addressable locations of a data storage in a logical sequence, and initially storing streaming data by accessing the logical sequence of addressable locations in a first direction, and for storing non-streaming data by accessing the logical sequence of addressable locations in a second direction which is opposite the first direction.

16 Claims, 3 Drawing Sheets

DATA STORAGE METHOD AND DEVICE FOR STORING STREAMING AND NON-STREAMING DATA IN COMMON MEMORY SPACE

BACKGROUND OF THE INVENTION

1. Field of the Invention

The present invention relates generally to storing data in a disk drive attached with a computer. More particularly, the invention relates to storing and accessing streaming and non-streaming data in disk locations of common memory space of the disk drive.

2. Background Information

A computer having an attached disk drive, such as a magnetic hard disk drive, employs a number of different types of computer programs that cooperate in processes involving accesses to the disk drive. These types include application programs such as word processor or spreadsheet programs, operating systems such as DOS, Windows, Unix, or Linux and device drivers. A chain of events leading to the writing of data to, or the reading of data from, a disk drive starts with an application program making a function call for a read/write action, and then issuing a file system service request to the operating system.

A typical operating system handles input/output (I/O) requests for stream data using the same procedure associated with I/O requests for non-stream data. Stream data can represent items of a temporal nature such as audio visual (A/V) data or musical data. Stream data can also represent other inherently linear sequential data structures. An inherently linear data structure is one which requires sequential access by its nature; that is, the data structure cannot be reasonably processed or reconstructed if accessed in a non-sequential order. This is in contrast to non-stream data which can be accessed randomly for processing or reconstruction with no inherent access order dependency.

More recently, proposals have been developed to accommodate the handling of I/O requests for stream data differently than the manner by which I/O requests for non-stream data are handled. For example, a document identified as "T13/D99128 revision 0" entitled "Proposal For Audio/Visual Feature Set" available from Western Digital Corporation of Irvine, California and a document identified as "T13D99123 revision 1" entitled "Proposal For Streaming AV Commands" available from Seagate Technology of Longmont, CO., describe proposals for handling the storage of stream and non-stream data. These proposals describe using multiple modes of operation, whereby a disk drive is placed into one set mode or configuration for I/O of stream data, and into other set mode or configuration for I/O of non-stream data.

In contrast to conventional I/O commands used to cause data transfers involving read or write actions, set configuration commands cause a change of conditions to affect the way that later I/O commands are performed until a subsequent reconfiguration command is generated. In the proposals for handling I/O of stream and non-stream data, set configuration commands are used to place a disk drive into a non-stream mode of operation or into a stream mode of operation. Before a read/write operation can be executed, the host operating system causes the drive to operate in the appropriate mode for either a stream operation or a non-stream operation. Requests associated with reading/writing non-stream data are handled using a drive mode that results in the data being stored on the disk drive in conventional fashion, without observing any specified rate at which the data is written to or read from memory. For example, an application program request to load application software (such as a spreadsheet program) into a disk drive involves writing non-stream, asynchronous data, which has no associated temporal requirements. This write operation can be executed between the host computer and the disk drive without satisfying any specified data rate constraint. The non-stream data is typically stored in a partitioned area of memory dedicated to non-stream data.

In contrast, application program requests which involve stream data are executed using a drive mode which ensures that associated temporal requirements of the data will be honored when the stream data is written to or read from the disk drive. The I/O requests between the host computer and the disk drive which are associated with a particular data stream occur consecutively, at regular intervals, so that the continuity of the stream can be preserved. The data is stored on the disk using a mode of operation which will ensure that the data rate constraint can be honored during subsequent reading of the data. The data is typically stored on the disk in a partitioned area, different from the area dedicated to non-stream data.

The use of different disk drive configurations, or modes, for stream data versus non-stream data, is due to an assumption that disk drives cannot freely mix streaming and non-streaming operations. On the other hand, mode switching is inefficient and may require processing in the disk drive which impacts performance. In addition, the storage of non-stream data and stream data in different, dedicated areas of memory so that data rate constraints (i.e., latency requirements) of the stream data can be honored results in inefficient use of the available memory space on the disk. For example, the space allocated to streaming data may fill-up, and result in an indication that subsequent streaming data can not be stored and accessed in compliance with a desired minimum latency, even though the space used for non-stream data is completely vacant.

Accordingly, it would be desirable to develop a method for processing file system service requests which involve non-stream data and stream data, wherein the use of set mode configuration commands can be avoided. In so doing, it would be desirable if the method could be easily integrated with conventional operating systems so that requests for both non-stream and stream data between a host computer and an attached disk drive can be executed without modification to existing file systems. It would also be desirable to store streaming data, along with non-streaming data, in common memory space wherein latency requirements of the streaming data can be satisfied without having to dedicate portions of the memory space among stream data and non-stream data in advance.

SUMMARY OF THE INVENTION

The invention is directed to a method for storing streaming and non-streaming data in dynamically allocated, common memory space of a data storage device comprising: organizing addressable locations of a data storage in a logical sequence; and initially storing streaming data by accessing the logical sequence of addressable locations in a first direction, and for storing non-streaming data by accessing the logical sequence of addressable locations in a second direction which is opposite the first direction.

This invention is also directed to an apparatus for storing streaming and non-streaming data in common memory space of a data storage device. The apparatus includes a data storage for storing data, the data storage having a plurality of addressable locations organized in a logical sequence; and a controller for initially storing streaming data by accessing the logical sequence of addressable locations in a first direction, and for storing non-streaming data by accessing the logical sequence of addressable locations in a second direction which is opposite the first direction.

Exemplary embodiments include dynamically allocating the logical sequence of addressable locations among streaming and non-streaming data, and reallocating a first set of addressable locations allocated to non-streaming data as addressable locations allocated to streaming data by linking said first set of addressable locations to comply with a latency requirement Exemplary embodiments respond to file system service requests for stream data or for non-stream data without a need for set mode configuration commands, in a manner as described in commonly assigned, co-pending U.S. application Ser. No. 09/515,275 (Attorney Docket No. K35A0561), entitled "METHOD FOR PROCESSING FILE SYSTEM SERVICE REQUESTS IN A COMPUTER HAVING AN ATTACHED DISK DRIVE THAT CAN REPRODUCE STREAM DATA AND NON-STREAM DATA", filed Feb. 29, 2000, the contents of which are hereby incorporated by reference in their entirety. For example, to accommodate legacy applications, the step of responding to a file system service request associated with an application program's function call can include intercepting the file system service request, and determining whether the file system service request is for stream data or non-stream data. The file system service request can specify parameters that identify the file system service request as a stream request. An application program interface (API) can be configured as an operating system extension, or "shim" in a manner as described in the co-pending application, to intercept and distinguish file system service requests identified as stream requests.

Where the shim intercepts all file systems service requests, it can also record whether the request is for non-stream data. A record can be created as a single data structure accessed by a disk device driver to issue stream access commands or non-stream access commands to the disk drive. The disk device driver can issue stream access commands, using for example, a stream pointer and the number of logical blocks included in the stream.

In exemplary embodiments, the addressable locations of the disk drive can be mapped from a logical space of the file system into a physical space of the disk drive using a linked list. The mapping can be performed within the disk drive using logical block addresses obtained from the file system using contents from the record.

According to exemplary embodiments, the data storage device is included in a disk drive attached to a computer, and the controller used to dynamically allocate and/or reallocate the logical sequence of addressable locations among streaming and non-streaming data is included on the disk drive.

DETAILED DESCRIPTION OF THE PREFERRED EMBODIMENTS

Figure 1A:
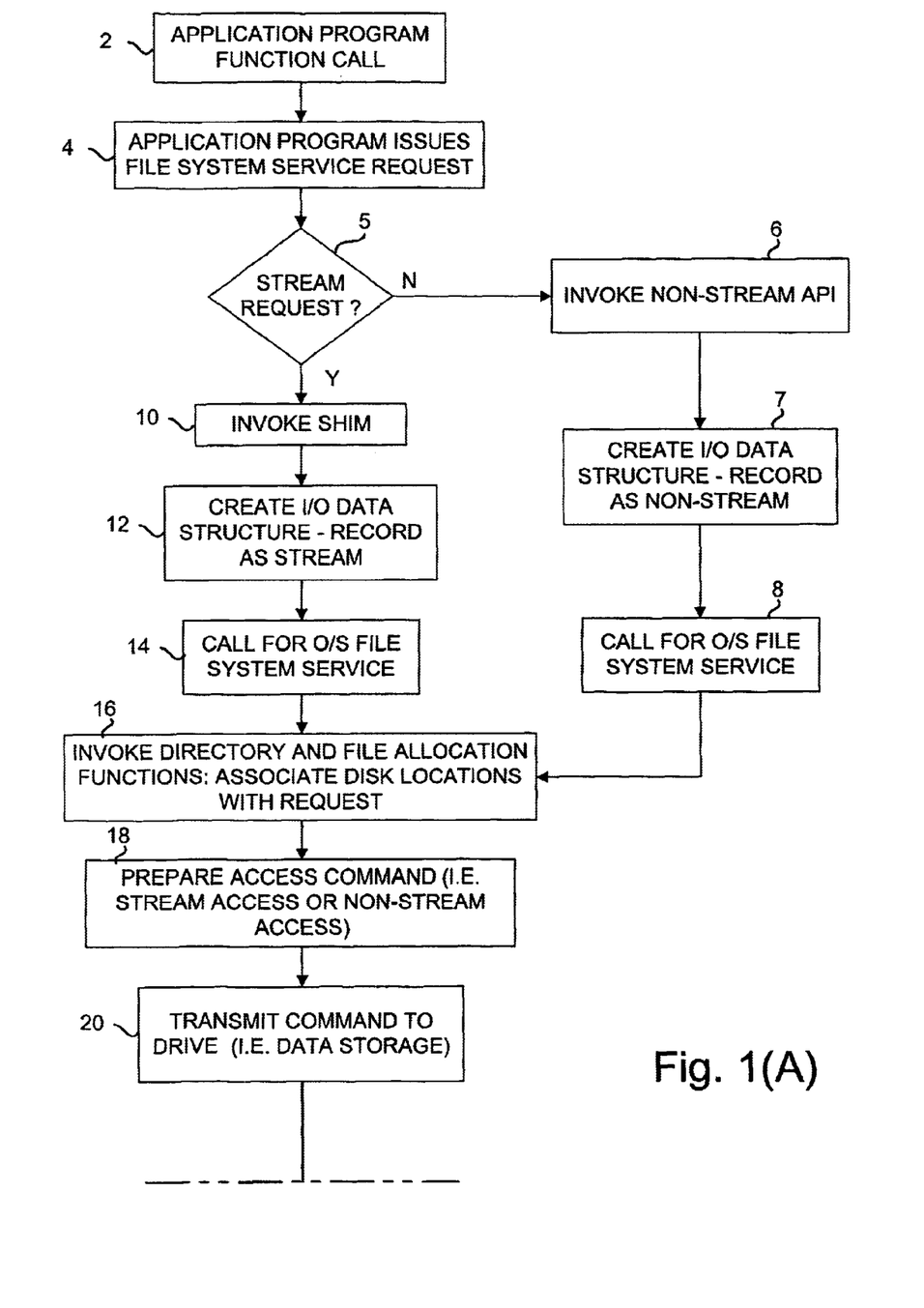
FIG. 1 is a flow chart showing an exemplary method for processing file system service requests associated with streaming and non-streaming function calls, by storing/accessing streaming and non-streaming data in common memory space.
Figure 1B:
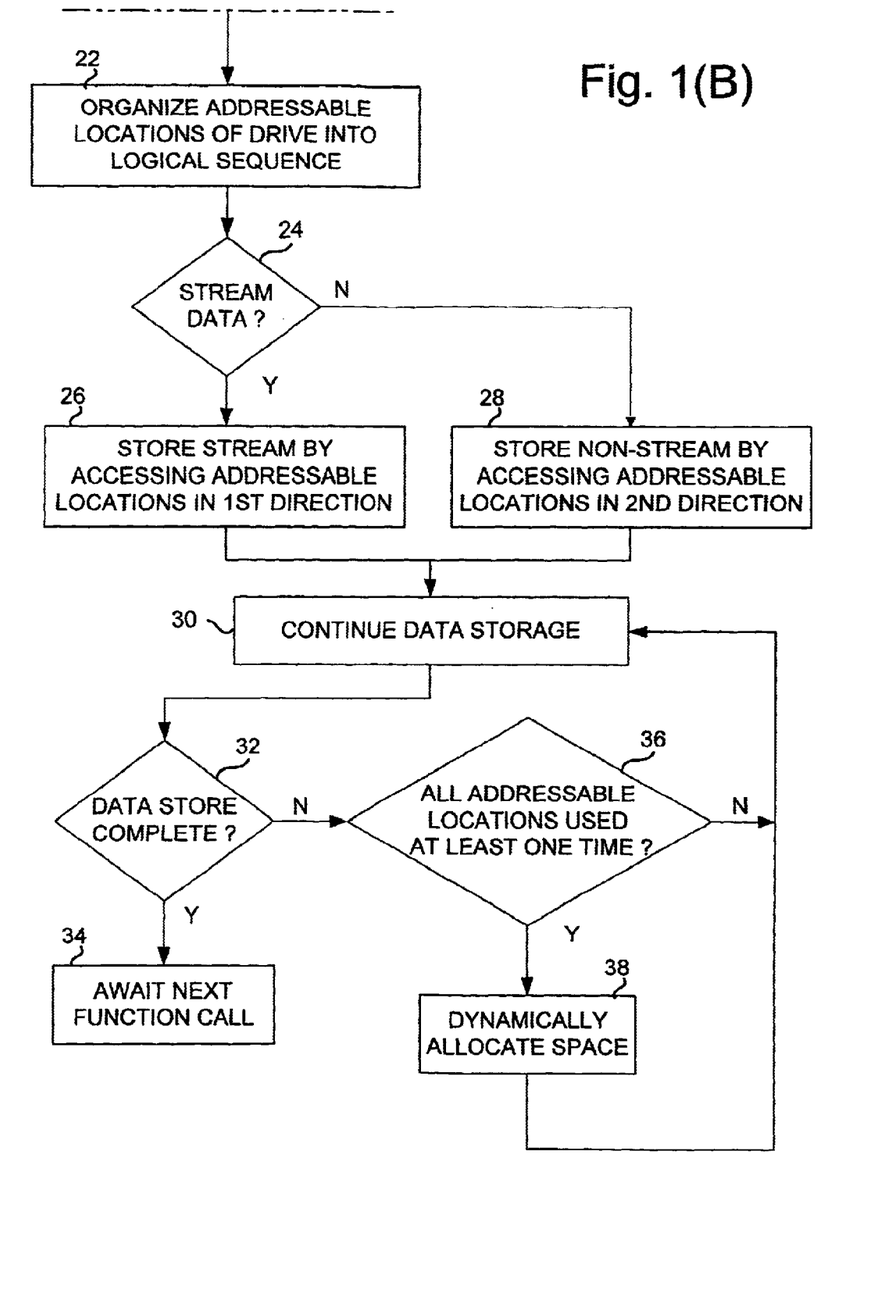

FIG. 1 shows an exemplary method for storing streaming and non-streaming data in common memory space of a data storage device attached with a computer. Generally speaking, application function calls are processed to distinguish file system service requests associated with stream data from requests associated with non-stream data in a manner as disclosed in the copending U.S. application Ser. No. 09/515,275, entitled "METHOD FOR PROCESSING FILE SYSTEM SERVICE REQUESTS IN A COMPUTER HAVING AN ATTACHED DISK DRIVE THAT CAN REPRODUCE STREAM DATA AND NON-STREAM DATA", the contents of which have been incorporated by reference. This process is generally represented by steps 2–20 of FIG. 1. The method of the present invention includes organizing addressable locations of a data storage in a logical sequence. After a file system service request has been transmitted to the drive in step 20, a controller which is, for example, included in the drive, initially stores streaming data by accessing the logical sequence of addressable locations in a first direction, and stores non-streaming data by accessing the logical sequence of addressable locations in a second direction which is opposite the first direction.

More particularly, referring to FIG. 1, a first file system service request is generated by an application program which has made a function call for a read or write action, as illustrated in step 2. In response to the function call, the application program issues the file system service request as represented by step 4. In decision block 5, a determination is made as to whether the file system service request is associated with stream data or non-stream data. This determination can be made either prior to, or within, an API configured as an operating extension, or "shim". That is, applications can be written to include function calls which result in issuance of file system service requests that specifically invoke the shim. Alternately, to accommodate legacy applications which do not include function calls with this capability, all file system service requests can be intercepted, before they invoke any API, to screen (i.e., determine) whether they are for stream data or non-stream data. This screening process can be implemented between the application programs and the API(s), or can be included within the shim or any other specified API.

Where the file system service request is associated with non-stream data, the file system service request can invoke a conventional API in step 6 to create an I/O control data structure in step 7. In accordance with an embodiment of the present invention, the I/O control data structure created by the API in step 7 can record whether the file system service request is for non-stream or stream data. This information can be recorded at any desired location. In another embodiment, information regarding requests for non-stream data need not be specifically recorded if a record of requests for stream data is maintained; that is, any requests not recorded as being stream requests can be presumed as requests involving non-stream data (or vice versa).

In step 8, the file system service request which has been determined to correspond to non-stream data calls for conventional operating system file system service. In step 16, the file system invokes directory and file allocation functions including associating a first set of disk locations of the disk drive with a first file system service request. In step 18, the file system prepares a first command that requires access to the first set of disk locations, the first command including control data categorizing the command as a non-stream access command or as a stream access command in response to the step of recording. In step 20, the disk driver issues the first command to the drive.

In step 22, addressable locations of the drive are organized in a logical sequence. Although this step is illustrated as occurring dynamically in the FIG. 1 flow chart after a command has been transmitted to the drive, it can, of course, be implemented in advance.

In step 24, a determination is made as to whether the data to be stored is stream data or non-stream data. In the case where it is to be stored as stream data, operational flow passes to step 26, wherein the stream data is stored by accessing the addressable locations in a first direction. In contrast, if the data is non-stream data, then operational flow passes from step 24 to step 28, such that non-stream data can be stored by accessing the addressable locations in a second direction which is opposite the first direction.

For example, where the addressable locations on the drive have been logically sequenced from an exemplary logical location (i.e., logical block) 1 to an exemplary logical location 1000, stream data can be stored beginning with logical location 1, and progressing upwards in the logical sequence towards logical location 1000. In contrast, non-stream data can be stored by initially accessing location 1000 and then progressing downward in the logical sequence. In this way, addressable locations in a common memory space are filled in a manner whereby streaming data and non-stream data grow towards one another.

The drive can keep track of addressable locations within the memory space allocated for streaming data and addressable locations allocated for non-streaming data in a dynamic fashion. The drive allocates streaming blocks according to the logical sequence of addressable locations, these locations having been determined in advance to map to a sequence of physical locations that comply with a given criteria, such as a given minimum latency requirement. As such, temporal characteristics associated with the streaming data during both read and write operations can be honored.

In contrast, conventional non-streaming data, such as random blocks of data, can be allocated to physical locations within the common memory space which correspond to addressable locations logically grown backwards from the logical end of the sequence. Those skilled in the art will appreciate that the specific sequence of logical blocks initially allocated to streaming data versus the blocks allocated to non-streaming data can be selected in any desired fashion, and the foregoing is by way of example only.

Exemplary embodiments of the present invention allow the operating system to account for block consumption and allocation of memory space on the drive in conventional fashion, without regard to the exact physical location where the data is stored. The operating system only maintains a record of the number of blocks which have been used and the number of blocks which are available on the drive, as well as the location of those blocks among the streaming and non-streaming data. As represented by step 30 of FIG. 1, the storage of data in response to a file system service request continues until the data storage associated with the request is complete in step 32. In step 34, operational flow proceeds to await a next function call so that a subsequent request to store or access streaming or non-streaming data can be serviced.

However, if before or during the storage of streaming or non-streaming data, the drive becomes full (i.e., the additional locations associated with streaming data have collided with the addressable locations associated with non-streaming data, or all blocks in the logical sequence have been allocated at least once to either streaming or non-streaming data), operational flow proceeds to step 36 of FIG. 1. In this step, it is determined that addressable locations do not exist in the logical sequence to store the data associated with the current file system service request because of a collision in the space initially allocated to streaming and non-streaming data, or because all locations have been allocated. Operational flow then proceeds to step 38, wherein an assessment can be made at the drive level to determine whether interleaved space in the logical sequence exists to accommodate the data.

For example, it may be that although the logical sequence of blocks allocated to streaming data and non-streaming data have collided, earlier blocks in the sequence associated with non-streaming data have been deleted. Accordingly, although the collision between the addressable locations allocated to streaming data and the addressable locations allocated to the non-streaming data have collided, there is still space available on the drive within the logical sequence of blocks to store the data. The drive will, in step 38, access these blocks and determine whether they can be reallocated (possibly in a new logical sequence) to comply with a minimum latency requirement associated with the streaming data being stored. If so, the streaming data of the current file system service request can be allocated to this space, resulting in an interleaving of streaming data with non-streaming data among the logical sequence of blocks. Reallocation of memory space can be performed in accordance with any known techniques including, but not limited to the well known heapsort algorithm as described, for example, with respect to FIG. 7.4 on page 148 of the book "*Introduction To Algorithms*", Leiserson, Charles E. et al, the MIT Press, Cambridge, Mass., the disclosure of which is hereby incorporated by reference in its entirety.

Those skilled in the art will appreciate that the initial step of organizing the addressable locations of the memory space can be implemented in accordance with any known heuristics, and that the invention is not limited to the example set forth above with regard to a latency criteria. In addition, those skilled in the art will appreciate that the entire memory space can be allocated using a doubly linked list scheme as described in commonly assigned, co-pending U.S. application Ser. No. 09/397,152 entitled "DISK-BASED STORAGE SYSTEM RESPONSIVE TO A DIRECTION-SELECTION SIGNAL FOR AUTO-MONOUSLY CONTROLLING SEEKS IN A SEQUENCE DETERMINED BY THE DIRECTION-SELECTION SIGNAL, AND A LOCALLY STORED DOUBLY LINKED LIST", now U.S. Pat. No. 6,499,083 the contents of which are incorporated herein by reference. Addressable locations within the space, beginning at one end or the other can be allocated to conventional non-streaming data as desired.

As described, heuristics can be used to implement a dynamic allocation and/or reallocation of the memory space. In a dynamic allocation, interleaved space is allocated among streaming and non-streaming data after an initial collision of the addressable locations allocated to streaming data with addressable locations allocated to non-streaming data. Of course, those skilled in the art will appreciate that in a dynamic allocation, rather than awaiting a determination that additional space is needed to service a particular file system service request, a periodic implementation of a defragmentation program can be used to reallocate space, so that the optimum number of addressable locations which can comply with a given minimum latency requirement will, at any given time, be available for storing streaming or non-streaming data.

Those skilled in the art will appreciate that, rather than using a dynamic reallocation of memory space, a static allocation can be used to refill memory space. That is, addressable locations allocated to streaming data can be grown toward addressable locations allocated to non-streaming data to initially define streaming and non-streaming spaces in the memory which are then maintained as such.

Referring again to FIG. 1, those skilled in the art will appreciate that exemplary embodiments of the present invention can optimize the storage of streaming and non-streaming data in a common memory space, and that this storage of streaming and non-streaming data can be implemented without modifying the file system of a conventional operation system. Thus, where a first file system service request is for non-stream data, a second file system service request which is for stream data can be processed without requiring a set mode configuration command. For example, where the second file system service request is determined as being for stream data in step 5, the file system service request invokes the API configured as a file system streaming "shim" for special handing of the request for stream data (see step 10 of FIG. 1).

In step 12, the shim creates an I/O control data structure whereby a second set of disk locations are associated on the disk drive with the second file system service request. As was discussed with respect to non-stream data, the I/O control data structure created by the shim in step 12 can record whether the file system service request is for stream data. Information regarding requests for stream data need not be specifically recorded if a record of requests for non-stream data is maintained.

Assuming that the second file system service request is recorded as being for stream data, the shim calls for operating system file system service in step 14. In step 16, the file system invokes directory and file allocation functions, which include associating a second set of disk locations of the disk drive with the second file system service request, and preparing a second command that requires access to a second set of disk locations, the second command including control data categorizing the command as a stream access command. In step 18, the file system calls the device driver, and in step 20, issues a device command to the drive.

The first and second requests can be received in any order (e.g., a request involving stream data can be received before or after a request involving non-stream data). The first non-stream access command and the second stream access command can be transmitted to the disk drive, in any desired order, regardless of the order in which the requests were received.

Figure 2:
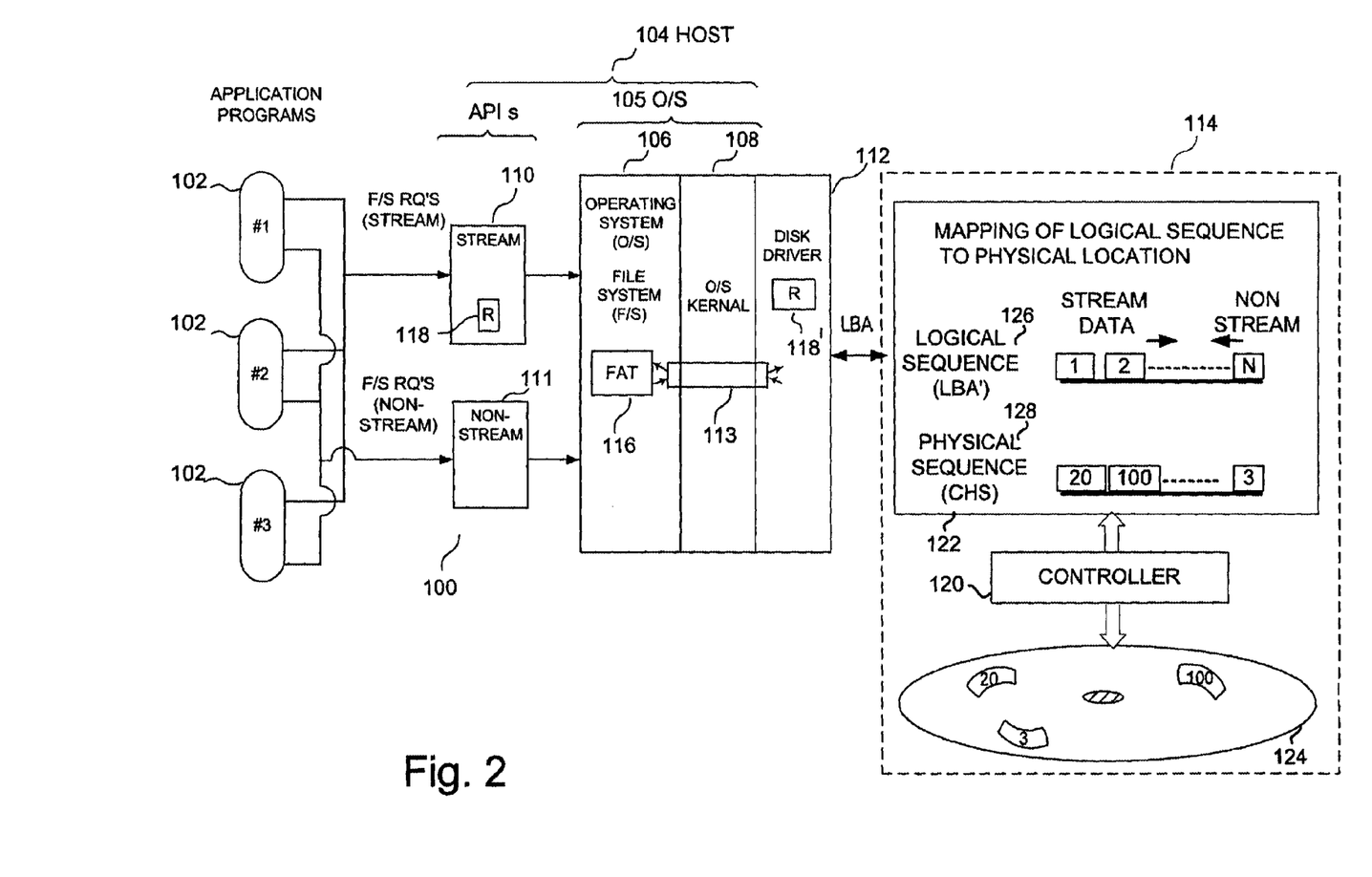
FIG. 2 is a functional block diagram showing a host computer and an attached disk drive and data structures used in the host computer in the practice of a method for storing/accessing streaming and non-streaming data using with the present invention.

With reference to FIG. 2, a system 100 comprises a host computer 104 and an attached disk drive 114. Host computer 104 executes one or more application programs 102 under an operating system ("OS") 105 comprising OS components 106 and 108. OS component 106 defines an OS file system and includes a file allocation structure represented as file allocation table ("FAT") 116. OS component 108 defines an OS kernel. OS 105 suitably is based upon any one of a variety of conventional operating systems such as those available from Microsoft (such as MS DOS and Windows), from Apple, or from various suppliers of Unix and Linux.

During execution, application programs 102 execute code which can include function calls. When executing code associated with a function call, an application program will issue a file system service request to OS 105. File system service requests can involve accesses to disk drive 114 which communicates with OS 105 via a driver 112. Disk drive 114 can communicate in accord with any of a variety of protocols including IDE, SCSI, and so forth, and driver 112 is configured for compatibility with the selected protocol.

The file system service requests and associated accesses can involve either stream data or non-stream data. These requests can be processed and the accesses accomplished without requiring the use of set configuration commands to change the mode of operation of disk drive 114 back and forth between a stream mode and a non-stream mode.

In one embodiment, the function calls made by the application programs result in issuance of file system service requests, specifically for stream data or for non-stream data. In alternate embodiments, legacy applications which do not produce function calls that issue special file system service requests for stream data verses non-stream data, can be accommodated. In one exemplary embodiment, all file system service requests can be intercepted and examined to determine whether they involve stream or non-stream data. Depending on this determination, an appropriate API can be used to produce a disk drive command.

The host 104 differs from prior art configurations in that it includes an apparatus for processing file system service requests to write data to or read data from disk locations to reproduce stream data and non-stream data. The apparatus includes means for responding to a first file system service request. The responding means includes an operating system extension configured, for example, as the application program interface (API) 110 referred to herein as a "shim" which is added to the file system. The responding means can be configured using any microprocessor having an associated operating system including, but not limited to, the microprocessor used to implement the host 104. The shim can be configured as a means for intercepting the first file system service request, and for determining whether the request is for stream or non-stream data. The apparatus also includes means for transmitting commands to the disk drive, represented in FIG. 1 as a modified I/O disk driver 112 which provides for communicating particularly useful information to disk drive 114 in distinguishing stream and non-stream commands.

The FIG. 2 host also includes a pipe, or conduit, 113 between OS component 106 and driver 112 to permit information to be readily passed between OS 105 and driver 112 in known fashion during I/O operations with disk drive 114. FAT 116 can be configured in accordance with any standard file system structure, and contents of a file allocation table are well known to those skilled in the art.

In addition to updating FAT 116, shim 110 can be configured to establish and maintain a separate record 118 to keep track of those logical block addresses in the file allocation table which correspond to stream data. Although the record 1 18 is shown in FIG. 2 as being included within the shim 110, this record alternatively can be maintained within OS component 106. In addition, rather than using a single record 118 associated with the file system which can be accessed by the driver 112, an additional record 118' can be included within driver 112 for recording stream identifiers associated with stream data at the disk level.

The "record", as defined herein, can be maintained in any manner which permits stream requests to be distinguished from non-stream requests. That is, the record can be maintained to identify all requests as being for either non-stream data or stream data. Alternately, the record can be maintained to specially identify file system requests involving only stream data, or a record can be maintained of requests involving only non-stream data. Thus, use of a single record to represent either requests involving stream data or requests involving non-stream data implicitly constitutes a record of requests regarding non-stream data and requests involving stream data, respectfully. Those skilled in the art will appreciate that the requests themselves can be considered the record(s), where each request includes an identifier to denote that it involves stream data or non-stream data.

Shim 110 can be one of many APIs used between the application programs 102 and the host 104. In the FIG. 2 embodiment, file system service requests specifically for stream data invoke the shim 110, while file system service requests specifically for non-stream data invoke a different API. For example, when an application program makes a function call that does not involve stream data, any of a plurality of conventional application program interfaces, such as the non-stream application program interface 111 can be called.

In an alternate embodiment, legacy applications can be accommodated by intercepting all file system service requests, before any API is invoked, to determine whether the request relates to stream or non-stream data. This functionality can be implemented using a heuristic included in the shim 110, the API 111 or any other location desired. For example, the shim 110 can be configured to intercept I/O file system service requests from all application programs, to thereby alert the disk drive 114 (via the disk driver 112) whether the pending commands to the drive involve stream data or non-stream data. The distinction can be made using any of a variety of user specified heuristics including, but not limited to, examining the file name for comparison with a directory of file name extensions that correspond to stream data (e.g., mpeg files). Any file names which can't be identified as involving stream data can be treated as involving non-stream data.

In accordance with the present invention, addressable locations of disk drive 114 can be allocated in response to the file system service requests of the application programs. The operating system 106 responds to the file system service request by preparing non-stream access commands or stream access commands to the disk drive 114. A stream access command can, for example, supply a conventional memory pointer designating the source or sink for the data, a stream number and offset for purposes of reading or writing the stream. The file allocation table, in conventional fashion, keeps track of the number of logical blocks which have been associated with a particular file system service request, and will, in the case of a write operation, deduct them from the amount of available space on the disk drive.

The translation of logical block addresses requested by the operating system 106 into physical locations on the drive itself can be performed either in the host computer or in the drive. However, in accordance with exemplary embodiments of the present invention, wherein a conventional operating system is used which has no knowledge of physical choices made by the drive, this translation can be performed in the drive in known fashion. After data has been written in physical address locations on the disk drive (for example, cylinder/head/sector locations) during a write operation, the disk drive reports back to the operating system that it has written so many blocks of a stream, and the operating system will note only the number of blocks which have been used. The operating system will retain no knowledge of where the drive has elected to place the blocks physically.

In the FIG. 2 example, information stored in the file allocation table 116 and the record 118 is used by the disk driver 112 to issue a first type of disk drive command (for example, a stream access command) or a second type of disk drive command (for example, a non-stream access command). Because set configuration commands are not needed to place the disk drive into a mode for handling one type of data or the other, non-stream access commands can be interleaved with stream access commands. The behavior of the FIG. 2 operating system remains unchanged in all respects at both the operating system and user levels, even though it can allocate disk space differently depending on whether the request involves stream data or non-stream data.

The foregoing file system service requests specify parameters which identify the stream name (e.g., "mystream.mpg"), the offset (i.e., location of the data block of interest within the stream), the length of the stream, the associated address and service of the stream, and the process identification (PID) of the stream. These file system service requests are specifically written to invoke the shim 110, and thus implicitly include an identifier that the request involves stream data. Where the request does not involve stream data, the file system service request would invoke another API, such as the non-stream API 111 in FIG. 2.

The exemplary shim 110 is configured to create a stream input/output control (IOCTL) data structure which can be passed between the file system and the disk driver.

In accordance with exemplary embodiments, the addressable locations of the disk drive are mapped from the logical space used by the file system into the physical space of the disk drive. In accordance with exemplary embodiments of the present invention, a linked list can be used that optimizes the efficiency with which streaming information is stored. Such a linked list is described in the aforementioned co-pending U.S. application Ser. No. 09/397,152, entitled: "Disk-Based Storage System Responsive To A Direction-Selection Signal For Autonomously Controlling Seeks In A Sequence Determined By The Direction-Selection Signal, And A Locally-Stored Doubly-link Linked List" (U.S. Pat. No. 6,499,083), the contents of which are incorporated herein by reference. By using a linked list, a more streamlined data structure and data transfer can be used.

Referring to FIG. 2, an exemplary embodiment of the present invention is shown for mapping addressable locations in a logical sequence to physical locations on a data storage represented as disk 124 of disk drive 114 via a map 122 associated with disk controller 120. The controller of the disk drive 114 can be implemented in a manner as described in commonly assigned, co-pending U.S. application Ser. No. 09/507,121, entitled "DISK DRIVE FOR SELECTIVELY SATISFYING A READ REQUEST FROM A HOST COMPUTER FOR A FIRST VALID DATA BLOCK WITH A SECOND VALID DATA BLOCK" (Attorney Docket No. K35A0581), and in U.S. Pat. No. 5,345,347 entitled "DISK DRIVE WITH REDUCED POWER MODES", the disclosures of which are hereby incorporated by reference in their entireties. The controller can, for example, be implemented as hardware, firmware, or any combination thereof. The control means can include a microcontroller such as that described in the aforementioned U.S. Pat. No. 5,345,347, programmed to set up and perform translation functions in accordance with exemplary embodiments of the present invention. The microcontroller can be configured to implement these functions in conjunction with other functions of the disk drive, such as scheduling functions, and functions described in the aforementioned U.S. Pat. No. 5,345,347.

The map 122 can be configured in any desired memory structure including, but not limited to, an EPROM, ROM, RAM, or any other memory structure. The map can be configured and stored using a set up mode of the microcontroller included as part of the controller 120.

In an exemplary embodiment where the disk drive 114 organizes addressable locations of the data storage in a logical sequence, a logical block address LBA is received from the disk driver 112 with respect to either streaming data or non-streaming data. Where the logical block address corresponds, for example, to streaming data, the disk drive 114 can translate the logical block address LBA into a logical block address LBA' which conforms with its organization of the common memory space into a logical sequence 126 on the data storage 124. For example, if this is the first streaming request, the first logical block address received can be correlated to the first logical block address in the logical sequence, represented as logical block address "1" in the map 122. The controller 120 can then translate this logical block address into a physical location (e.g., a physical cylinder, head, sector, or CHS, address) having a corresponding physical sequence 128 on the disk media. Of course, those skilled in the art will appreciate that the logical block address received from the disk driver 112 can be directly translated into a physical location on the disk media provided some mechanism is included in the disk drive 114 to keep track of how the memory space has been allocated among streaming and non-streaming data.

Where the logical block address received from the disk driver 112 corresponds to non-streaming data, the map included in the disk drive can associate this address to a logical block address labeled "N" which corresponds to the last block in the logical sequence of LBA' blocks in the common memory space. The controller 120 can then translate this logical block address of the map 122 into a physical location on the data storage. Thus, where the addressable locations of the disk drive have been organized into a logical sequence 126, streaming data can initially be stored from one end of the logical sequence and non-streaming data can be stored from the opposite end of the non-streaming sequence, or from any other desired locations in the logical sequence.

The map 122 of the disk controller 120 can be used to map each block of streaming or non-streaming data to a physical location on the drive, with physical locations associated with streaming data being sequenced to comply with a heuristic, such as a minimum latency requirement. In an exemplary embodiment, wherein the controller included in the disk drive is used for dynamic allocation/reallocation in accordance with exemplary embodiments of the present invention, the controller 120 dynamically allocates the logical sequence of addressable locations among streaming and non-streaming data. Using a heuristic, such as a minimum latency requirement, the controller can also be configured to reallocate a first set of addressable locations allocated to non-streaming data as addressable locations allocated to streaming data. Alternately, the controller can also reallocate a first set of addressable locations previously allocated to streaming data as addressable locations allocated to non-streaming data.

Those skilled in the art will appreciate that the physical blocks associated with a particular stream will typically not be physically adjacent one another on the disk 124. For example, the blocks in the physical sequence 128 of FIG. 2 are mapped to the logical sequence in such a manner that a sequence of doubly linked physical blocks associated with a given set of streaming data can be accessed to provide uninterrupted audio/video.

As already mentioned, another heuristic can be included in the shim 100 (or any other element of the FIG. 1 system) to distinguish requests for stream data versus requests for non-stream data. An exemplary heuristic examines file extensions for comparison against a list of known extensions involving stream data, examines access length against a user specified access length associated with typical streams, and examines file format for user-specified structures that reveal streams.

I claim:

1. Method for storing streaming and non-streaming data in common memory space of a data storage device comprising:
   organizing addressable locations of a data storage in a logical sequence;
   initially storing streaming data by accessing the logical sequence of addressable locations in a first direction, and for storing non-streaming data by accessing the logical sequence of addressable locations in a second direction which is opposite the first direction; and
   reallocating a first set of addressable locations allocated to non-streaming data or to streaming data as addressable locations allocated to streaming data or to non-streaming data, respectively.

2. Method according to claim 1, comprising:
   dynamically allocating the logical sequence of addressable locations among streaming and non-streaming data.

3. Method according to claim 1, comprising:
   responding to a first file system service request by recording whether the first file system service request is for non-streaming or streaming data.

4. Method according to claim 3, wherein the first file system service request is for streaming data and a second file system service request is for non-streaming data, and wherein the first and second file system service requests can be received in any order.

5. Method according to claim 3, wherein first and second commands associated with the first and second file system service requests can be transmitted to the disk drive in any order, regardless of the order in which the first and second file system service requests are received.

6. Method according to claim 3, wherein the first file system service request specifies parameters that identify a streaming request.

7. Method according to claim 1, wherein the step of initially storing includes:
   updating a file allocation structure; and
   maintaining a record for requests involving streaming data.

8. Method according to claim 1, comprising:
   mapping addressable locations of the storage device from a logical space into a physical space using a linked list.

9. Method according to claim 8, wherein the data storage device is included within a disk drive, and the mapping is performed within the disk drive using logical block addresses obtained using contents of a record for requests involving streaming data.

10. Method according to claim 1, wherein the reallocating includes linking the first set of addressable locations to comply with a latency requirement.

11. Method for storing streaming and non-streaming data in common memory space of a data storage device comprising:
    organizing addressable locations of a data storage in a logical sequence;
    initially storing streaming data by accessing the logical sequence of addressable locations in a first direction, and for storing non-streaming data by accessing the logical sequence of addressable locations in a second direction which is opposite the first direction; and responding to a first file system service request by recording whether the first file system service request is for non-streaming or streaming data, wherein first and second commands associated with the first and second file system service requests can be transmitted to the disk drive in any order, regardless of the order in which the first and second file system service requests are received.

12. Method for storing streaming and non-streaming data in common memory space of a data storage device comprising:

organizing addressable locations of a data storage in a logical sequence; and initially storing streaming data by accessing the logical sequence of addressable locations in a first direction, and for storing non-streaming data by accessing the logical sequence of addressable locations in a second direction which is opposite the first direction, wherein the step of initially storing includes:

updating a file allocation structure; and maintaining a record for requests involving streaming data.

13. Apparatus for storing streaming and non-streaming data in common memory space of a data storage device, comprising:

a data storage for storing data, the data storage having a plurality of addressable locations organized in a logical sequence; and a controller for initially storing streaming data by accessing the logical sequence of addressable locations in a first direction, and for storing non-streaming data by accessing the logical sequence of addressable locations in a second direction which is opposite the first direction, wherein the controller reallocates a first set of addressable locations allocated to non-streaming data or to streaming data as addressable locations allocated to streaming data or to non-streaming data, respectively.

14. Apparatus according to claim 13, wherein the controller dynamically allocates the logical sequence of addressable locations among streaming and non-streaming data.

15. Apparatus according to claim 13, wherein the controller is included in the disk drive.

16. Apparatus according to claim 13, wherein the reallocating includes linking the first set of addressable locations to comply with a latency requirement.

* * * * *